United States Patent [19]

Distin et al.

[11] Patent Number: 4,643,047
[45] Date of Patent: * Feb. 17, 1987

[54] SPEED REDUCING GEARING MECHANISM EMPLOYING TROCHOIDALLY FORMED GEAR SURFACES FOR ROLLING TORQUE TRANSMISSION

[75] Inventors: Robert Distin, Louisville; James Shaffer, Estes Park, both of Colo.

[73] Assignee: Advanced Energy Concepts '81 Ltd., Boulder, Colo.

[*] Notice: The portion of the term of this patent subsequent to Apr. 29, 2003 has been disclaimed.

[21] Appl. No.: 313,442

[22] Filed: Oct. 20, 1981

[51] Int. Cl.[4] .............................................. F16H 1/28
[52] U.S. Cl. ......................................... 74/804; 74/63; 74/465; 74/798
[58] Field of Search ...................... 74/63, 86, 803, 804, 74/465, 798, 198

[56] References Cited

U.S. PATENT DOCUMENTS

| | | | |
|---|---|---|---|
| Re. 24,288 | 3/1957 | Nanni | 74/63 |
| 605,844 | 6/1898 | Belanger | 74/750 B |
| 606,158 | 6/1898 | Belanger | 74/801 |
| 1,444,717 | 2/1923 | Webb | 118/70 |
| 1,634,453 | 7/1927 | Carroll | 74/805 |
| 1,706,180 | 3/1929 | Morison | 74/798 |
| 1,735,616 | 11/1929 | Morison | 74/798 |
| 1,738,662 | 12/1929 | Morison | 74/63 |
| 1,748,907 | 2/1930 | Vallance | 74/800 |
| 1,773,568 | 8/1930 | Braren | 74/804 |
| 1,862,220 | 6/1932 | Johnson | 74/804 |
| 1,870,875 | 8/1932 | Scheuer | 74/63 |
| 2,481,627 | 9/1949 | Sharpe | 74/804 |
| 2,874,594 | 2/1959 | Sundt | 74/805 |
| 2,913,911 | 11/1959 | Gilkey | 74/60 |
| 3,094,880 | 6/1963 | Maroth | 74/60 |
| 3,139,772 | 7/1964 | Maroth | 74/800 |
| 3,202,019 | 8/1965 | Faxen | 74/796 |
| 3,270,683 | 9/1966 | McDermott | 103/130 |
| 3,272,142 | 9/1966 | Easton | 103/130 |
| 3,304,809 | 2/1967 | Hellen | 74/798 |
| 3,307,582 | 3/1967 | McDermott | 137/625.11 |
| 3,413,896 | 12/1968 | Wildhaber | 92/57 |
| 3,427,898 | 2/1969 | Mayer | 74/640 |
| 3,439,562 | 4/1969 | Bickley | 74/804 |
| 3,468,175 | 9/1969 | Rabek | 74/63 |
| 3,472,097 | 10/1969 | Huska | 74/760 |

List Continued on next page.

FOREIGN PATENT DOCUMENTS 348514 2/1922 Fed. Rep. of Germany.
303709 1/1929 United Kingdom.

OTHER PUBLICATIONS

Pannikov, V. M., *Planetary Reduction Gearing with Eccentroid Cot Pin Epicycloidal and Hypocycloidal Engagements*, Mashinostroyenie, Moscow, 1948, p. 5.
Kudryavtsev, V. N., *Planetary Gearing*, Mashinostroyenie, Moscow, 1966, pp. 12, 260, 272.
Volkov, D. L., Kraynev, A. F., *Planetary, Wave, and Combination Gearing in Construction and Roadbuilding Machines*, Mechanical Engineering, Moscow, 1968, p. 174.

*Primary Examiner*—Leslie A. Braun
*Assistant Examiner*—Joseph M. Rolnicki
*Attorney, Agent, or Firm*—Sughrue, Mion, Zinn, Macpeak, and Seas

[57] ABSTRACT

An epicyclic speed reducing mechanism employs, as torque transmitting elements, a series of rolling elements which are constrained to travel along a substantially trochoidal path defined by means of complementary or conjugate surface regions formed on the driving and driven members. The invention is applicable to single or multiple stage speed reducers, and may be of the counterweighted or counterbalanced variety, the latter including a constant velocity coupling operating between an orbiting and rotating element and a further element. In the disclosed embodiments, the rolling elements may be either balls or rollers, and the surface regions may be conjugate epitrochoidal and hypotrochoidal grooves.

37 Claims, 11 Drawing Figures

U.S. PATENT DOCUMENTS

| | | | |
|---|---|---|---|
| 3,525,890 | 8/1970 | Buchanan | 310/82 |
| 3,572,983 | 3/1971 | McDermott | 418/61 |
| 3,587,350 | 6/1971 | Wanlass | 74/800 |
| 3,595,103 | 7/1971 | Wildhaber | 74/800 |
| 3,667,320 | 6/1972 | Robinson | 74/640 |
| 3,727,473 | 4/1973 | Bayer | 74/198 |
| 3,910,733 | 10/1975 | Grove | 418/61 B |
| 3,979,167 | 9/1976 | Grove | 418/61 B |
| 4,003,272 | 1/1977 | Volkov et al. | 74/640 |
| 4,023,440 | 5/1977 | Kennington et al. | 74/804 |
| 4,099,427 | 7/1978 | Fickelscher | 74/804 |
| 4,157,668 | 6/1979 | Fukuma et al. | 74/798 |
| 4,194,415 | 3/1980 | Kennington et al. | 74/805 |
| 4,216,677 | 8/1980 | Tuzson | 74/17.8 |
| 4,235,128 | 11/1980 | Kanervo et al. | 74/798 |
| 4,259,043 | 3/1981 | Hidden et al. | 418/55 X |
| 4,271,726 | 6/1981 | Ryffel | 74/805 |
| 4,282,777 | 8/1981 | Ryffel et al. | 74/804 |

SPEED REDUCING GEARING MECHANISM EMPLOYING TROCHOIDALLY FORMED GEAR SURFACES FOR ROLLING TORQUE TRANSMISSION

BACKGROUND OF THE INVENTION

Torque transmitting systems of the epicyclic type are quite well known for their utility as speed reduction mechanisms. Typically, an orbiting internal pinion gear will be provided with one or a few less teeth than an outer ring gear, such that a quite large speed reduction can be obtained between the input and an output appropriately coupled to the pinion gear.

Gear systems of this type, however, suffer from a number of disabilities. In particular, they are expensive to produce, inasmuch as the gears must be precisely cut. Moreover, such devices can transmit only a limited amount of torque due to the fact that only some fraction of the gear teeth are in contact at any given instant. Additionally, input, output and intermediate bearing sets have always been necessary in such systems, often in double sets, in order to accommodate large loads on the gearing elements, and adding to the cost of such gearing systems.

The only known example of a prior art system operating somewhat similarly to the present construction is disclosed in U.S. Pat. No. 1,738,662 to Morison. This patent relates to a ball drive transmission wherein an input shaft 11 bears upon and rotatably drives a set of three balls 21–23 where one ball has a smaller diameter than the other two. This diameter difference causes a ring 32 disposed surrounding the balls to orbit about the axis of the input shaft as the balls rotate. The orbiting ring 32 serves as an input to the epicyclic gearing mechanism which comprises a plurality of balls held by means of a cage 6.

An outer stationary ring is formed with a plurality of indentations equal to the number of balls +1. In operation, the orbiting ring 32 successively forces the balls into the indentations such that the balls roll from one indentation to another. As they do so, the cage 6 is made to rotate, and the output is taken off from this element.

Although quite different in structure and operation, the Morison patent is seen to generally teach the idea of torque transmitting elements which roll or circulate during operation.

SUMMARY OF THE INVENTION

The present invention provides a unique alternative to prior speed reduction gearing which is at the same time more flexible, more compact for its load rating and less expensive to produce. The drive system includes a pair of conjugate epi and hypotrochoidally cut grooves disposed in driving and driven disks, with a plurality of rolling elements disposed between and transmitting torque from a driving to a driven member. As the driving member orbits about its axis, the driven element is made to rotate at a reduced speed dependent upon the numbers of "lobes" of the opposed grooves, while the rolling torque transmitting elements circulate, following a substantially trochoidal path and maintaining constant contact with both grooves.

DETAILED DESCRIPTION OF THE PREFERRED EMBODIMENT

Figure 1:
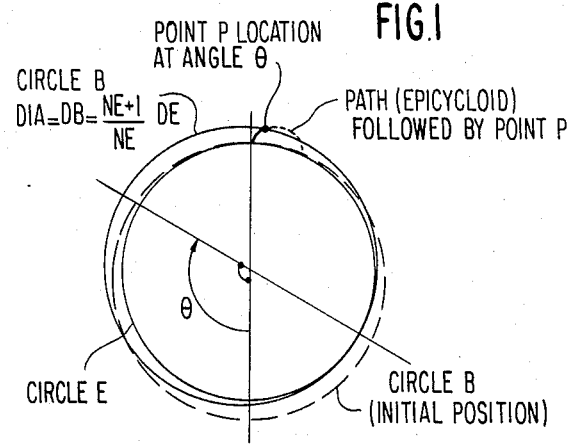
FIGS. 1 and 2 schematicly illustrate the generation of epitrochoidal and hypotrochoidal curves, respectively.
Figure 2:
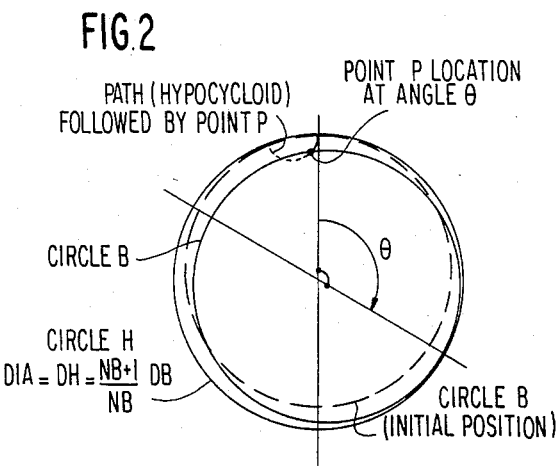

Turning now to the drawing figures, and in particular to FIGS. 1 and 2, the evolution of epicyloidal and hypocycloidal curves is illustrated. Generally, the epicycloid (hypocycloid) is generated by a point on the circumference of a circle having a first diameter as it rolls on the outside (inside) of a fixed circle of a second diameter. In FIG. 1, an epicycloid is formed by tracing the path of a point P on circle B as this circle rolls about a circle E. The circle B has a diameter DB, where:

$$DB = \frac{NE + 1}{NE} \cdot DE \qquad (1)$$

where DE is the diameter of circle E, and NE is the number of lobes or "loops" traced out by the point P.

In FIG. 2, a hypocycloid is generated as the circle B rolls around the inside of a circle H of diameter DH, where:

$$DH = \frac{NE + 2}{NE + 1} \cdot DB = \frac{NE + 2}{NE} \cdot DE \qquad (2)$$

while a point on the circumference of the circle B traces out the path. In gearing terminology, the diameters DE and DH are the pitch diameters of the epicycloid and hypocycloid, respectively.

Figure 3:
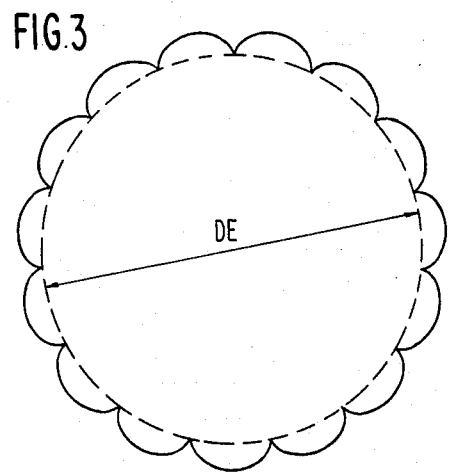
FIGS. 3 and 4 depict the resultant curves generated by the method of FIGS. 1 and 2.
Figure 4:
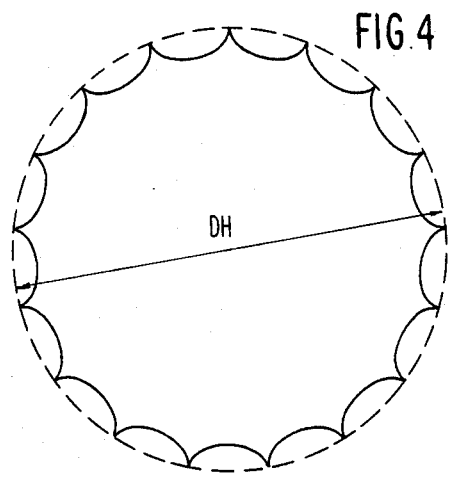

The resultant curves are shown in FIGS. 3 and 4 for the epicycloid and hypocycloid, respectively. As will be noted, the hypocycloid has two more "lobes" than does the epicycloid, in the present case 17 and 15, respectively. Although epi- and hypocycloidal paths have been illustrated for ease of description, it should be noted that the more general family of curves, the trochoids, and especially both prolate and curtate epitrochoids and hypotrochoids, may be used. Accordingly, the latter terms will be used henceforth, in order to generalize the discussion.

Figure 5:
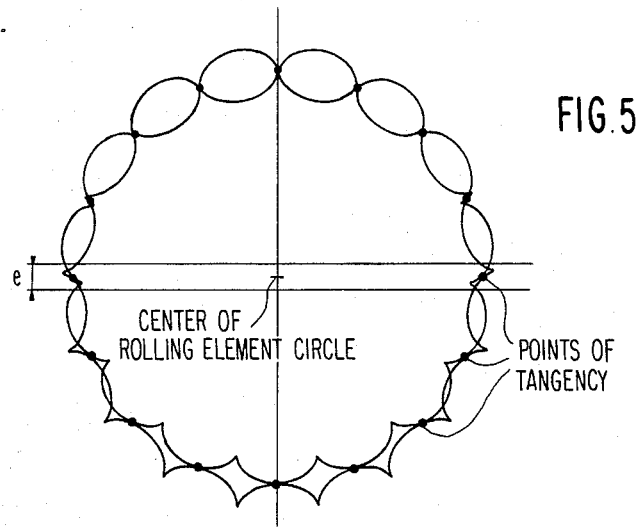
FIG. 5 illustrates the curves of FIGS. 3 and 4 superimposed on one another and offset.

FIG. 5 illustrates a set of epi- and hypotrochoidal paths superimposed on one another and offset by a small amount e equal to $DE/NE = DH/NH$, where NH is the number of hypotrochoidal lobes ($=NE+2$). It will be observed that the two curves are tangent at 16 points, each equally spaced from the others. These points of tangency will become the locations of the rolling elements which will operate between a driving and a driven disk having epi- and hypotrochoidal grooves or "races" cut therein. Ordinarily, a cage member similar to those employed in common universal joints will be used to maintain the rolling elements separated by the prescribed distance.

Figure 6:
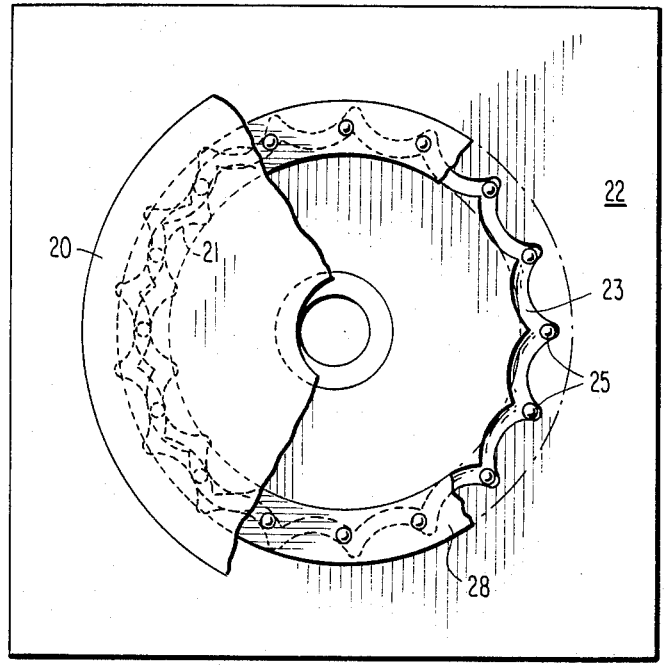
FIG. 6 shows a simple speed reducer according to the invention designed for exemplitive purposes and utilizing the curves of FIGS. 3 and 4 as opposed races for the rolling driving elements.

FIG. 6 illustrates a very simple speed reducer operating in the manner just described. A first member 20 has an epitrochoidal groove 21 cut therein having 15 lobes, and mates with a second member 22, by way of a plurality of rolling balls 25. The second member 22 has a hypotrochoidal groove or ball race 23 having 17 lobes therein. Sixteen balls 25 are entrained between the two members 20, 22, at the points where the two ball races are tangent. As the tangent points are evenly distributed, the balls 25 are circularly disposed about a center lying halfway between the gearing axis and the offset distance e between the two curves (see FIG. 5). Ball cage 28, provided in the form of an aperatured ring, maintains a constant spacing between adjacent balls. Either of the two trochoidal ball race members 20, 22 (hereinafter referred to as trochoraces) may be the driving member.

By way of illustration, let it be assumed that trochorace 22 is held stationary, while trochorace 20 is made to orbit by suitable means, such as by a rotary shaft provided with an eccentric cam having an eccentricity e substantially equal to the amount of offset between the two races (see FIG. 5). In such an instance, assuming clockwise orbital movement, trochorace 20 will be made to rotate about its own axis in a counterclockwise fashion and at a rate dependent upon the relative numbers of lobes on the trochoraces 20, 22:

$$\frac{input}{output} = \frac{1}{1 - \frac{n_1}{n_2}} \quad (3)$$

where:
$n_1$ = number of lobes on the driving member, and
$n_2$ = number of lobes on the driven member In the condition described, the trochorace 22 is considered as the "driving" member while race 20 is considered to be the driven member. In the present case, the above formula yields a reduction ratio of $$-\frac{15}{2}$$

or −7.5:1, where the minus sign indicates that the direction of the output is opposite that of the (orbital) input.

This motion is not unlike the motion of a freely rotatable pinion orbiting inside an internally toothed ring gear, a structure commonly employed in epicyclic transmissions. Here, however, the balls 25 are the "teeth", and due to the manner of engagement between the trochoraces, the balls are not stationary, but rather roll between the trochoraces, circulating in the direction of the output while following generally trochoidal paths. In this instance, the circle formed by the balls generally has its center at a point halfway between the center of the driving shaft (gearing axis) and the center of the eccentric used to orbitally drive the trochorace.

Assuming now that the trochorace 20 is made to orbit as before, but is now held against rotation, the trochorace 22 will now be made to rotate. In this instance, the speed reduction will be +8.5:1, as the trochorace 20 is now the driving element. The balls, of course, will circulate in the clockwise direction as they roll, tracing out substantially trochoidal paths and carrying the cage in this direction also. Analogizing to conventional gear systems as before, the present motion is not unlike that of a rotationally locked pinion orbiting inside of a freely rotatable ring gear.

Although the output trochorace (here 22) rotates at a constant velocity, it is worthy of note that the circulating balls do not. Rather, as they roll between the opposing grooves, they will travel more quickly through the "loop" portions of the curve, and more slowly through the "nodes" joining adjacent loops. Thus, at a given moment, one of the balls will be at its maximum velocity while traversing a loop, and one of the balls will be at its minimum velocity or stationary as it moves through a node. In terms of torque transmission, (in the case of a cycloid) the stationary ball transmits the maximum instantaneous torque, while the rapidly moving ball transmits the least. A very important advantage of the present system over conventional gearing is that a large number of the teeth (balls) are in torque transmitting engagement any given time, whereas in spur gearing only a few are in contact. Even in the best prior epicyclic transmissions, it is impossible for more than a fraction of the total number of teeth to be in engagement at any given time.

Referring further to the gearing of FIG. 6, let it now be assumed that trochorace 22 is the driving gear, orbiting, but rotationally stationary. In this event, the driven trochorace 20 will be made to rotate, and this rotation will be in the direction opposite the (orbital) input. Referring to the formula given previously, the speed ratio in this case is −7.5:1.

Finally, turning back to the previous example wherein trochorace 22 was driven by 20, let it now be assumed that instead of remaining rotationally stationary, the trochorace 20 is instead made to rotate counterclockwise while orbiting clockwise. In such a case, the output speed or speed ratio cannot be determined by the simple formula given previously, as the "backward" rotation (recession) of the input gear is not taken into account. However, it is plain that the speed ratio will be higher than previously. This fact is used to advantage in the two stage speed reduction transmissions illustrated in FIGS. 7–10.

Figure 7:
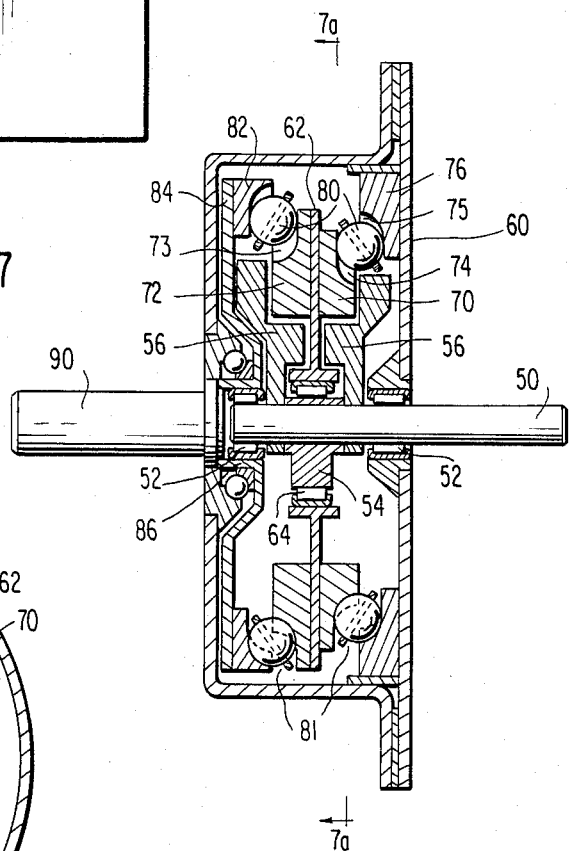
FIG. 7 illustrates a first practical embodiment of a two stage epicyclic speed reducer according to the invention.
Figure 7A:
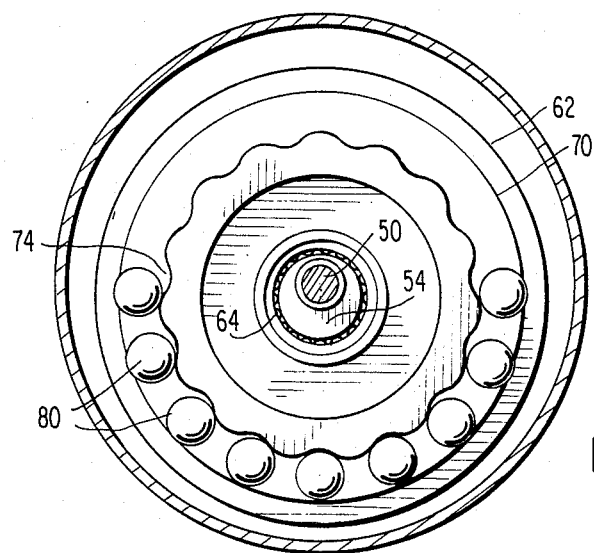
FIG. 7a is a section through the transmission of FIG. 7, illustrating the driving trochorace disks of the invention.

FIG. 7 illustrates one practical embodiment of a double stage speed reducing transmission using trochoraces as described above. As shown, an input shaft 50 is received within a stationary housing 60, and is journaled for rotation therein by means of bearings 52. The shaft 50 includes an eccentric portion 54, which may be formed integrally with or separately from the shaft. Also attached to the shaft 50 are a pair of system counterweights 56, as will be described below.

The eccentric or cam member 54 bears upon the inner periphery of a driver disk 62, through the intermediary of a ring of antifriction Torrington bearings 64. In this manner, the disk 62 is made to undergo orbital movement at a speed determined by that of the input shaft 50. Due to the presence of bearings 64, the disk 62 is capable of rotation about its axis independently of the orbital motion.

Attached to the driver disk 62 by suitable means are a pair of opposed driving raceways or trochoraces 70, 72, the structure of which is more clearly seen in FIG.

7a. Race 70 contains an epitrochoidally cut groove 74, which is in engagement with a plurality of balls 80 entrained in cage 81. The complementary hypotrochoidal race 76 is fixedly attached to a portion of stationary housing 60 so as to form therewith a stator.

Due to the engagement between trochoraces 70, 76, the race 70 will be caused to rotate about its own axis in a direction opposite that of the input, and at a reduced speed dependent upon the number of lobes of the opposed grooves 74, 75. The race 70 rotates reversely to the input due to the fact that the stator pitch diameter, and thus the number of trochoidal lobes, is greater than that of the race 70. Since race 70 is fixedly coupled to driving disk 62, as is race 72, these elements will rotate-/orbit as a unit.

Race 72 is substantially similar to race 70, but differs in that the pitch diameter thereof is somewhat larger. The epitrochoidal groove 73 of race 72 is in contact with a further series of caged balls 80 which transmit torque between race 72 and driven hypotrochoidal output raceway 82.

Since race 72 is orbiting at a speed determined by the input shaft 50, and rotating in the direction opposite thereto at a reduced speed, the final output at race 82 or output shaft 90 is at a further reduced speed, in the direction opposite to the input at 50 so long as the pitch diameter of race 82 times that of race 70 is less than the pitch diameter of race 76 times that of race 72. Formulae for precisely determining the speed and direction of the output will be set forth following the present discussion.

As illustrated in FIG. 7, the race 82 is integral with an output plate 84, which is in turn connected to output shaft 90. Output plate 84 is formed to present a cup-shaped region 86 at its radially inner periphery, which assists in journaling the input shaft 50 within the housing 60.

ment, and the same is true of stator member 122, except that now the stator trochorace has been incorporated into the housing itself. The drive between the epitrochoidal race of the trochorace element 112 and the hypotrochoidally cut race of the stator 122 proceeds as described previously; with trochorace element 112 being made to rotate reversely with respect to the input, and at a reduced speed, while orbiting due to the action of the eccentric 106.

However, the connection between the idlers or trochorace elements 110 and 112 is not necessarily one of matched epitrochoidal and hypotrochoidal grooves. Rather, and as more clearly seen in FIG. 9, the races 130, 132 cut into elements 110, 112 are simple circles, with a ball element 80 joining the opposing circular pockets. In this manner, a constant velocity coupling (CVC) is realized between elements 110, 112. In effect, the rotary "component" of the compound motion of trochorace 112 will be transmitted to trochorace 110 at constant velocity, while the orbital motion component will not. To this end, the amount of radial "play" of the coupling is designed to be substantially equal to the combined eccentricities of cams 104, 106. A three stage version incorporates matched epitrochordal and hypotrochordal tracks in place of the CVC.

The torque transmitting connection between element 110 and the output 120 is identical to that described in the preceeding embodiment, since the trochorace 110 rotates reversely to the input at a first speed reduction, while orbiting at the input speed due to eccentric cam 104. Accordingly, the output 120 is driven reversely to the input, and at a second, greatly reduced speed.

In either of the practical embodiments of FIGS. 7 or 8, the speed ratio can be easily determined by means of the formulae given below. As will be noted, the reduction ratio is dependent only upon the numbers of teeth or "lobes" of the several gear or trochorace elements.

$$\frac{\text{input speed}}{\text{output speed}} = \frac{1}{1 - \left(\frac{\text{number of stator teeth or lobes}}{\text{number of lobes on first orbiting gear}} \cdot \frac{\text{number of lobes on second orbiting gear}}{\text{number of output member lobes}}\right)} \quad (4)$$

Since the driving plate 62 and gears or races 70, 72 are mounted for conjoint movement, the imbalance forces generated as a result of the orbital movement thereof can be easily cancelled out by means of counterweights 56. The counterweights are sized and shaped such that a particularly axially compact arrangement can be achieved. Also, the weights may be independently sized so that the associated race or gear members 70, 72 may be independently balanced.

Figure 8:
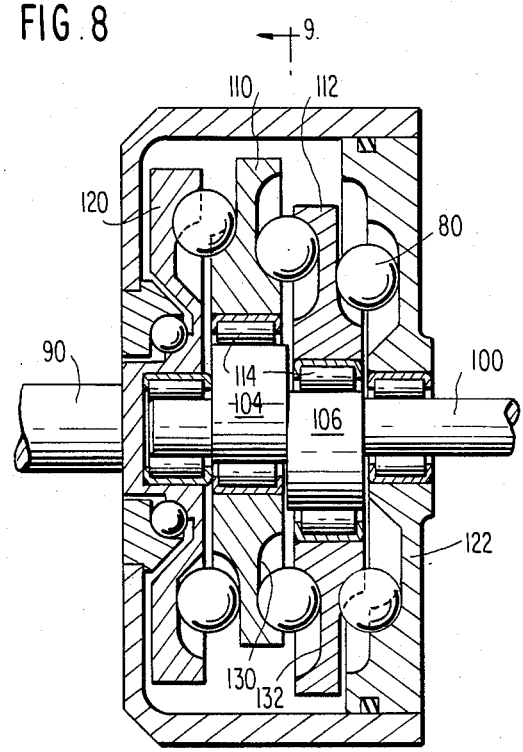
FIG. 8 depicts a second practical two stage speed reducing transmission according to the invention, using counterbalancing.

Another method of balancing is illustrated in the two stage embodiment shown in FIG. 8. This device is substantially similar to the embodiment just described, except that the driven trochorace disks 110, 112 are self balancing, so that no counterweights are required. In particular, the input shaft 100 is provided with a pair of eccentric/cam elements 104, 106, which are arranged on the shaft so as to be 180° "out of phase" with respect to one another. The two eccentrics 104, 106 bear upon trochorace elements or idlers 110, 112, respectively, through intermediary roller bearing sets 114. Accordingly, since the gear elements 110, 112 are designed to have the same weight, and because they are arranged orbitally at 180° with respect to each other, the entire system is maintained in balance.

The embodiment of FIG. 8 has an output member 120 essentially identical to that of the preceeding embodi- If, in the above equation, the number of lobes of the trochoidal race of the stator is represented by $n_1$; the numbers of lobes on the driven trochorace disks 70, 112; 72, 110 are represented by $n_2$ and $n_3$, respectively; and the number of lobes on the output gear or trochorace 82, 120 is represented by $n_4$, the speed ratio can be more conveniently written as $$\frac{\text{input speed}}{\text{output speed}} = \frac{1}{1 - \left(\frac{n_1 \cdot n_3}{n_2 \cdot n_4}\right)} \quad (5)$$

Alternatively, since the numbers of trochoidal lobes are directly proportional to the pitch diameters of the several trochorace elements, the above equations can likewise be expressed in terms of pitch diameters, if convenient.

As an example, if the number of lobes of the trochoidal raceways of the stator, first and second driven trochoraces (70,72) and output member 82 of FIG. 7 are 17, 15, 16 and 18, respectively, it can be readily ascertained that the overall speed ratio of the transmission would be −135:1. Of course, the reduction ratio may be readily changed by replacing pairs of interengaging trochoraces with others having different numbers of lobes, and it is desirable to manufacture the present invention with interchangable trochorace elements for this purpose. It will be noted that equation (5) above becomes indefinite when $n_1 \cdot n_3$ equals $n_2 \cdot n_4$. In this instance, the reduction ratio approaches infinity (e.g., the output does not rotate). In practical terms, this would occur when the stator and the output trochorace have the same number of lobes while the first and second trochoraces also have identical numbers of lobes. In such a case, with reference to FIG. 7 for example, the second trochorace 72 would be rotationally recessing at a rate of $-8:1$ with respect to the input rotation, assuming $n_1-n_4$ of 18,16,16,18, respectively. There would be no output rotation in this event.

Figure 10:
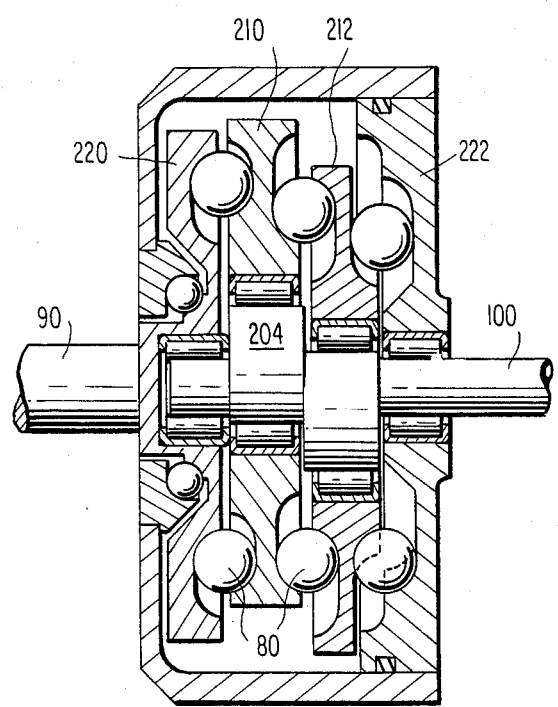
FIG. 10 illustrates a practical counterbalanced single stage speed reducer substantially similar to the two stage reducer of FIG. 8.
Figure 9:
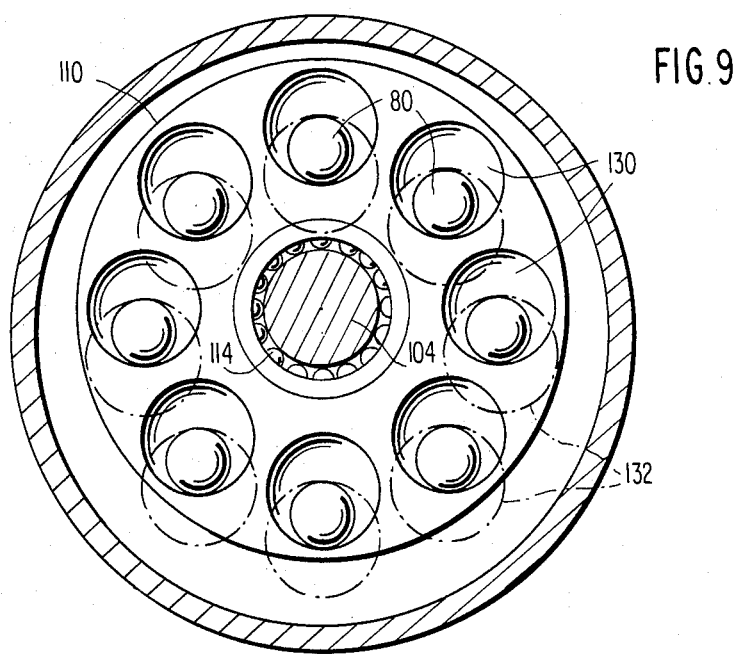
FIG. 9 is a section through the FIG. 8 speed reducer, showing the construction of a constant velocity coupling thereof.

A variation of the design of FIG. 8 is illustrated in FIG. 10. This embodiment is counterbalanced rather than counterweighted, like the FIG. 8 device, but achieves only a single stage rather than two stage reduction. The right hand half (e.g., stator 222 and first trochorace element 212) of the gearbox is identical to that found in FIG. 8, while the distinction between the two speed reducers lies in the manner of engagement between the second race element 210 and the output member 220.

Instead of being provided with conjugate pairs of epi- and hypotrochoidal races, elements 220 and 210 are joined by a constant velocity coupling (CVC), similarly to the coupling between trochorace disk 212 and stator 222. In particular, both elements 210 and 220 are provided merely with circular recesses 212, 222, joined together by balls 80. For this reason, in this embodiment the element 210 is more appropriately referred to as a transfer disk, rather than as a trochorace disk.

In operation, the transfer disk orbits at a speed determined by the input due to the action of eccentric 204, while receiving the rotary component of the compound motion of trochorace element 212 as an input, due to the action of the CVC operating between transfer disk 210 and trochorace 212 as previously described in connection with FIG. 8. The rotary motion of the disk 210 is transmitted in constant velocity fashion to the output 220, while the orbital component of its motion is not, owing to the radial "play" between disk 210 and output 220, the amount of such play being equivalent to the eccentricity of the cam 204. Accordingly, the rotation of trochorace disk 212 is transmitted to the output shaft 240 without further reduction or change of rotary direction.

The calculation of the reduction ratio of the single stage gearbox of FIG. 10 is quite straightforward, and can be expressed as $$\frac{\text{input speed}}{\text{output speed}} = \frac{1}{1 - \frac{n_1}{n_2}} \quad (6)$$

where $n_1$ and $n_2$ are the numbers of teeth or lobes on the stator and trochorace disk, respectively. It will be noted that this equation is identical to that given in connection with the exemplitive embodiment of FIG. 6. As an example, if the number of lobes on the stator 222 and trochorace disk 212 are 14 and 16, respectively, the reduction ratio would be 8:1. Of course, the entire system is maintained in balance, due to the dynamic counterbalancing performed by disks 210, 212.

The speed reducers illustrated in FIGS. 6-10 have numerous advantages over conventional speed reduction gearing some of which have been mentioned previously. For example, the amount of contact area between driving and driven surfaces is increased in comparison with conventional drives. This advantage stems from the fact that, as discussed above, the present invention allows all of the torque transmitting bodies to be in contact at all times. This is in comparison to conventional gears which permit only a fraction of the teeth to be engaged or in mesh at a given time.

Further, due to the increased number of "teeth" maintained in contact, the amount of torque that can be transmitted is quite large for the size of the gear train. Accordingly, smaller speed reduction units with higher load carrying capability may be designed. In addition, since all of the rolling elements can be made to be always in contact with both the driving and driven members, an inherently anti-backlash system is obtained.

The torque capacity of gearing made according to the invention can be increased by either adding more rolling elements (and hence using trochoraces with greater numbers of lobes) or by adding additional races. In particular, it is possible to construct trochorace disk pairs having two or more concentric trochoidal races cut therein.

In the prior art, output, input and intermediate bearings were a necessity, and frequently pairs of such bearings were required to withstand large loads. In contrast, the present invention requires fewer bearings since the driving elements themselves are capable of bearingly supporting several of the components. Since the balls themselves support a substantial amount of the load, the shaft bearings and eccentric journal bearings support relatively lesser loads, and are therefore longer lived. The driving balls, even though acting as bearings as well as torque transmitting bodies, are subjected to very little wear. As is well known, bearing wear is related to pressure times bearing velocity. However, as explained above, the driving balls of the present invention are at the greatest pressure (highest torque transmission) when at lower velocities or stationary, and move at their highest speed when transmitting minimum torque.

In practice, it has been found that the counterbalance method of dynamic balancing of FIGS. 8 and 10 is superior to the counterweighted embodiment of FIG. 7. In particular, the counterweighted system has a much larger moment of inertia that a like counterbalanced system, and thus the counterbalanced gear set is much more advantageous for use with driving bidirectional motors such as stepping motors or synchronous motors. Also, the counterbalanced arrangement is better from a lubrication standpoint.

Although the invention has been described in connection with an epicycling speed reducer employing balls as the rolling elements, it should be noted that the invention is not limited to such. In particular, the invention is equally applicable to systems employing rollers rather than balls, and to nutating as well as epicycling drives.

For example, one simple way of using cylindrical rollers rather than balls would be to make the driving and driven members concentric, and replace the epi- and hypotrochoidal grooves with epi- and hypotrochoidal surfaces, where these surfaces can be defined by a locus of lines parallel to the input axis.

Similarly, a nutating system might easily be developed by replacing the teeth normally used in such drives with epi- and hypotrochoidal opposing undulating surfaces, according to another aspect of the invention. It is intended to cover in the appended claims all such variations and modifications as fall within the spirit and scope of the invention.

What is claimed is:

1. A speed reducing transmission, comprising:
   a driving member;
   a driving member; and
   an intermediate element comprising a plurality of rolling elements, said rolling elements transmitting torque from said driving member to said driven member, wherein said driving and driven members are provided with complementary generally trochoidally shaped surface regions upon which said rolling elements bear as they roll, said surface regions being formed so that said rolling elements travel in a substantially trochoidal path, said surface regions being further formed such that each individual rolling element is in substantially constant rolling contact with both said generally trochoidally shaped surface regions simultaneously.

2. A speed reducing transmission, comprising:
   an input;
   an output;
   a stator; and
   an intermediate, solely orbitally driven member between said stator and said output, a pair of intermediate elements respectively disposed between said stator and said intermediate member and between said output and said intermediate member, said intermediate elements each comprising a series of rolling elements,
   said stator and said output each having a generally trochoidal gear surface formed thereon, and said intermediate member having two such gear surfaces formed thereon, on opposite sides thereof, the rolling elements of a first of said intermediate elements rollingly engaging gear surfaces of said intermediate member and said stator, such that at least a substantial number of said rolling elements are in rolling contact with both these gear surfaces simultaneously, and the rolling elements of a second of said intermediate elements rollingly engaging gear surface of said intermediate member and said output, such that at least a substantial number thereof are in rolling contact with both these latter gear surfaces simultaneously.

3. A speed reducing transmission as claimed in claim 1, wherein said surface regions comprise at least one set of conjugate epitrochoidal and hypotrochoidal races for said rolling elements, the epitrochoidal race being provided on one of said members and the hypotrochoidal race on the other of said members.

4. A speed reducing transmission as claimed in claim 1, wherein said rolling elements are balls and said surface regions comprise races for said balls.

5. A speed reducing transmission as claimed in claim 1, wherein said intermediate element further comprises a cage for maintaining said rolling elements in spaced relationship.

6. A speed reducing transmission as claimed in claim 3, wherein said epitrochoidal and hypotrochoidal races are epicycloidal and hypocycloidal races.

7. A speed reducing transmission as claimed in claim 1, wherein said rolling elements are balls and said complementary surfaces comprise grooves through which said balls roll.

8. A speed reducing transmission as claimed in claim 3, further comprising an input shaft for driving said driving member, said shaft including a cam member and said driving member being journaled on said cam, whereby the driving member is orbitally driven.

9. A speed reducing transmission, comprising:
   an input;
   a stator;
   an output;
   a plurality of rolling elements for transmitting torque from the input to the output;
   an intermediate member between said stator and said output, said intermediate member comprising first and second race members, said stator and said output being provided with races complementary to races on said first and second race members, respectively, said first race member and said stator race having a first set of rolling elements disposed therebetween, said second race member and said output race having a second set of rolling elements disposed therebetween, said race of said first race member and said stator race being formed with substantially trochoidal curvature such that each of said rolling elements disposed therebetween is in substantially rolling contact with said race of said first race member and said stator race; and
   means for orbitally driving said intermediate member.

10. A speed reducing transmission as claimed in claim 9, wherein said first and second race members, said stator race and said output race are formed so that said rolling elements travel in a substantially trochoidal path while transmitting torque.

11. A speed reducing transmission as claimed in claim 10, further comprising means for rotationally coupling said first and second race members, said orbital driving means comprising an eccentric cam fixed to said input.

12. A speed reducing transmission as claimed in claim 10, wherein each of said races is formed as a trochoidal groove.

13. A speed reducing transmission as claimed in claim 9 or 11, further comprising counterweight means for countering imbalance forces generated by orbital movement of said intermediate member.

14. A speed reducing transmission as claimed in claim 13, wherein said counterweight means comprises a pair of counterweights attached to said input and arranged on either side of said intermediate member.

15. A speed reducing transmission as claimed in claim 12, wherein said rolling elements are balls, and said races on said output and said stator are hypotrochoids while said races on said first and second race members are epitrochoids.

16. A speed reducing transmission as claimed in claim 15, wherein the balls are maintained in constant contact with both an epitrochoidal and a hypotrochoidal race.

17. A speed reducing transmission as claimed in claim 9, wherein said first and second race members are independently orbitally driven and are maintained orbitally separated by 180° for countering imbalance forces generated by orbital movement of said intermediate member.

18. A speed reducing transmission as claimed in claim 17, wherein said first and second race members are rotationally coupled.

19. A speed reducing transmission as claimed in claim 17, wherein said first and second race members, said stator race and said output race are formed so that said rolling elements travel a substantially trochoidal path while transmitting torque.

20. A speed reducing transmission as claimed in claim 19, further comprising a constant velocity coupling for rotationally coupling said first and second race members.

21. A speed reducing transmission as claimed in claim 20, wherein said rolling elements are balls, and said races on said output and said stator are hypotrochoids, while said races on said first and second race members are epitrochoids.

22. A speed reducing transmission as claimed in claim 21, wherein said constant velocity coupling comprises facing circular recesses in said first and second race members, and a ball member joining each pair of facing recesses.

23. A speed reducing transmission, comprising:
an input;
an output;
a stator;
an intermediate member between said stator and said output;
means for orbitally driving said intermediate member;
a plurality of rolling torque transmitting elements arranged between said intermediate member and said output, and between said intermediate member and said stator, said intermediate member being provided with first and second race members on either side thereof in rolling contact with said rolling elements, wherein said stator is provided with a race member complementary to the confronting race member of said intermediate member and upon which said rolling elements therebetween bear as they roll, said complementary race members being formed with substantially trochoidal curvature such that said rolling elements travel along a substantially trochoidal path, said complementary race members being further formed such that all of said rolling elements disposed therebetween are maintained in substantially constant rolling contact with both of said complementary race members.

24. A speed reducing transmission as claimed in claim 23, wherein said complementary surfaces comprise epitrochoidal and hypotrochoidal races for said rolling elements.

25. A speed reducing transmission as claimed in claim 24, wherein said means for orbitally driving comprises cam means affixed to said input.

26. A speed reducing transmission as claimed in claim 25, wherein said intermediate member comprises a pair of disk elements, said disk elements being independently orbitally driven and maintained orbitally separated by 180°.

27. A speed reducing transmission as claimed in claim 26, further comprising a first constant velocity coupling rotatably connecting said pair of disk elements, and a second constant velocity coupling rotatably joining said intermediate member and said output.

28. A speed reducing transmission as claimed in claim 27, wherein said first constant velocity coupling comprises facing circular recesses formed in said disks, and ball members joining said facing recesses, and said second constant velocity coupling comprises facing circular recesses, one set of recesses being formed in said output and a second set of recesses being formed in a rear side of a first of said pair of disks and constituting said first race member, and ball members joining said facing recesses.

29. A speed reducing transmission, comprising: a driving member, a driven member and an intermediate element comprising a plurality of rolling elements arranged in a single layer and floating cage means therefor, said rolling elements transmitting torque from said driving member to said driven member, wherein said driving and driven members are provided with complementary surface regions upon which said rolling elements bear as they roll, said surface regions being formed of a plurality of lobes which together entrain said rolling elements, said surface regions being further formed with substantially trochoidal curvature such that all of said rolling elements are simultaneously maintained in substantially constant rolling contact with both of said complementary surface regions.

30. A speed reducing transmission as claimed in claim 23, wherein said intermediate member comprises a pair of disk elements, said output and said stator being provided with a second pair of complementary surfaces entraining rolling elements therebetween, and wherein a third pair of complementary surfaces are provided on facing surfaces of said disks.

31. A speed reducing transmission as claimed in claim 30, wherein said second and third complementary surfaces each comprise conjugate epitrochoidal and hypotrochoidal races for said rolling elements.

32. A speed reducing transmission, comprising:
a driving member;
a driven member; and
an intermediate element comprising a plurality of rolling elements, said rolling elements transmitting torque from said driving member to said driven member, wherein said driving and driven members are provided with complementary surface regions upon which said rolling elements bear as they roll, said surface regions comprising at least one set of conjugate epitrochoidal and hypotrochoidal races for said rolling elements, the epitrochoidal race being provided on one of said members and the hypotrochoidal race on the other of said members, whereby said rolling elements travel in a substantially trochoidal path, said epitrochoidal and hypotrochoidal races being formed and arranged such that each of said rolling elements is in substantially constant rolling contact with both said races.

33. A speed reducing transmission, comprising:
an input;
an output;
a stator;
an intermediate member between said stator and said output;
means for orbitally driving said intermediate member; and
a plurality of rolling torque transmitting elements arranged between said intermediate member and said output, and between said intermediate member and said stator, wherein said stator and said intermediate member are provided with complementary surfaces upon which said rolling elements therebetween bear as they roll, said surfaces being formed such that said rolling elements travel along a substantially trochoidal path, said complementary surfaces being further formed such that all of said rolling elements disposed therebetween are maintained in substantially constant rolling contact with both of said complementary surfaces, wherein said complementary surfaces comprise epitrochoidal and hypotrochoidal races for said rolling elements.

34. A speed reducing transmission, comprising:
a driving member;
a driven member; and
an intermediate element comprising a plurality of rolling elements, said rolling elements transmitting torque from said driving member to said driven member, said driving and driven members being respectively provided with surface regions having conjugate epitrochoidal and hypotrochoidal curvature, wherein each said rolling element is maintained in substantially constant rolling contact with both said epitrochoidal and hypotrochoidal surfaces.

35. A speed reducing transmission, comprising:
a stator;
an intermediate member;
an output member;
rolling elements transmitting torque between said stator, said intermediate member, and said output member, said stator and said output member each having race members maintained in rolling contact with said rolling elements, said intermediate member having a race member arranged on either side thereof and likewise maintained in rolling engagement with said rolling elements, wherein at least two of said race members are formed as a conjugate pair of epitrochoidal and hypotrochoidal races.

36. A speed reducing mechanism, comprising:
an input;
a stator;
an output; and
an intermediate element between said stator and said output, said intermediate element comprising a plurality of balls, each of which reacts against said stator and transmits torque to said output member and is in constant rolling contact with each, said stator and said output member each including surface regions upon which each said ball bears as it rolls, said surface regions being formed with substantially trochoidal curvature such that said balls travel in a substantially trochoidal path.

37. A transmission, comprising:
a driving member;
a driven member; and
an intermediate element arranged between said driving and driven members, said intermediate element comprising a plurality of rolling elements and rolling element cage means, said rolling elements transmitting torque from said driving member to said driven member, said driving and driven members being respectively provided with surface regions having substantially trochoidal curvature such that said rolling elements travel in a substantially trochoidal path as they transmit torque between said surface regions, said rolling element cage means comprising a floating, non-torque transmitting element primarily functioning to maintain said rolling elements in a predetermined spaced relationship.

* * * * *